United States Patent
Takata et al.

(10) Patent No.: US 6,852,270 B2
(45) Date of Patent: Feb. 8, 2005

(54) PRODUCTION METHOD OF DRAWN FILM (75) Inventors: Atsuhiro Takata, Toyonaka (JP); Ryuma Kuroda, Ibaraki (JP); Satoshi Hanada, Ibaraki (JP); Takeshi Yamada, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 226 days.

(21) Appl. No.: 10/093,539

(22) Filed: Mar. 11, 2002

(65) Prior Publication Data

US 2003/0032687 A1 Feb. 13, 2003

(30) Foreign Application Priority Data

Mar. 15, 2001 (JP) ........................................ 2001-073340
Apr. 16, 2001 (JP) ........................................ 2001-117008

(51) Int. Cl.[7] ........................... B29C 55/08; B29C 67/20
(52) U.S. Cl. ..................... 264/564; 264/154; 264/210.1; 264/210.5; 264/210.6; 264/288.8; 264/290.2

(58) Field of Search .............................. 264/210.5, 154, 264/210.1, 210.6, 211.12, 288.8, 290.2, 564

(56) References Cited

U.S. PATENT DOCUMENTS 3,966,686 A * 6/1976 Asakura et al. ............. 528/331
4,892,779 A * 1/1990 Leatherman et al. ........ 428/220

FOREIGN PATENT DOCUMENTS

| JP | 58-90924 A | 5/1983 |
| JP | 5-4276 A | 1/1993 |
| JP | 10-193451 A | 7/1998 |

* cited by examiner

Primary Examiner—Leo B. Tentoni
(74) Attorney, Agent, or Firm—Sughrue Mion, PLLC

(57) ABSTRACT

A drawn film production method including steps of drawing a crystalline thermoplastic resin film in the TD direction is characterized in that the orientation coefficient of the c-axis of the crystal of the thermoplastic resin in the film to the MD direction of the film is 0.8 or higher.

15 Claims, 5 Drawing Sheets

PRODUCTION METHOD OF DRAWN FILM

BACKGROUND OF THE INVENTION

1. Field of the Invention

The present invention relates to a production method of a drawn film, more particularly a production method capable of producing a drawn film or a porous film as a film with excellent evenness even from a resin material with a high melt viscosity and low melt drawing.

2. Description of the Related Art

Although being excellent in terms of strength, e.g., a high elastic modulus, a film made of a crystalline thermoplastic resin is easy to cause drawing spots and be deteriorated in the transparency. Therefore, techniques have been developed to solve such defective points; the formation of the drawing spots and the easiness of transparency decrease; by complicatedly controlling the drawing temperature, the drawing speed conditions in the case of biaxial drawing (for example, Japanese Unexamined Patent Publication No. 58-90924).

Nevertheless, even by doing so, the defects that the drawing spots are formed and the transparency is easy to be decreased can not reliably be solved, and furthermore, techniques to solve these disadvantageous points of the conventional techniques by strictly setting the drawing conditions have widely been known (for example, Japanese Unexamined Patent Publication No. 5-4276).

However, the above-described conventional production methods all require complicated control of drawing conditions, yet the uniformity of an obtained drawn film is insufficient, and especially in the case of a thermoplastic resin having a high crystallinity, accordingly, having a high elastic modulus and excellent strength, any reliable solution for the drawing unevenness has not been developed yet and there still remains room for improvement.

Also, as for porous films produced by conventional techniques, drawing unevenness has been found not a little and in the case of a film produced from a resin material with a high melt viscosity and a low melt drawing, for example, a thermoplastic resin composition containing a long molecular chain polyolefin resin, that is especially significant and the film is not sufficient yet in the uniformity and there still remains room for improvement.

SUMMARY OF THE INVENTION

Taking the problems which the above-described conventional techniques have into consideration, it is an object of the present invention is to provide a method for producing a drawn film of a crystalline thermoplastic resin with the good mechanical balance, little drawing unevenness, and excellent uniformity without causing drawing crack or the like at the time of drawing.

Another purpose of the invention is to provide a production method for a porous film with little drawing unevenness and excellent uniformity even in the case of a film to be produced from a resin material with high melt viscosity and lowmelt drawing, for example, a thermoplastic resin composition containing a large quantity of a long molecular chain polyolefin resin.

The above-described purposes can be achieved by the inventions described in the respective claims. That is, the production method of a drawn film according to the present invention is a method for drawing a film made of a crystalline thermoplastic resin in the TD direction and is characterized in that a film of which the thermoplastic resin has 0.8 or higher orientation coefficient of the c-axis of the crystal to the MD direction of the film is used as the film made of the crystalline thermoplastic resin.

In this case, the MD direction of the film means the flow direction of the film at the time of production and the TD direction means the orthogonal direction to the flow direction and the thickness direction of the film.

With such constitution, even in the case of the film produced from a thermoplastic resin with especially high crystallinity, it is made possible to provide a method for producing a drawn film with the good mechanical balance, little drawing unevenness, and excellent uniformity without causing drawing crack or the like at the time of drawing.

In the present invention, the description, "orientation coefficient of the c-axis of the crystal of the thermoplastic resin in the film made of the crystalline thermoplastic resin to the MD direction of the film", means Hermans orientation coefficient calculated by a wide angle x-ray diffraction.

Figure 1:
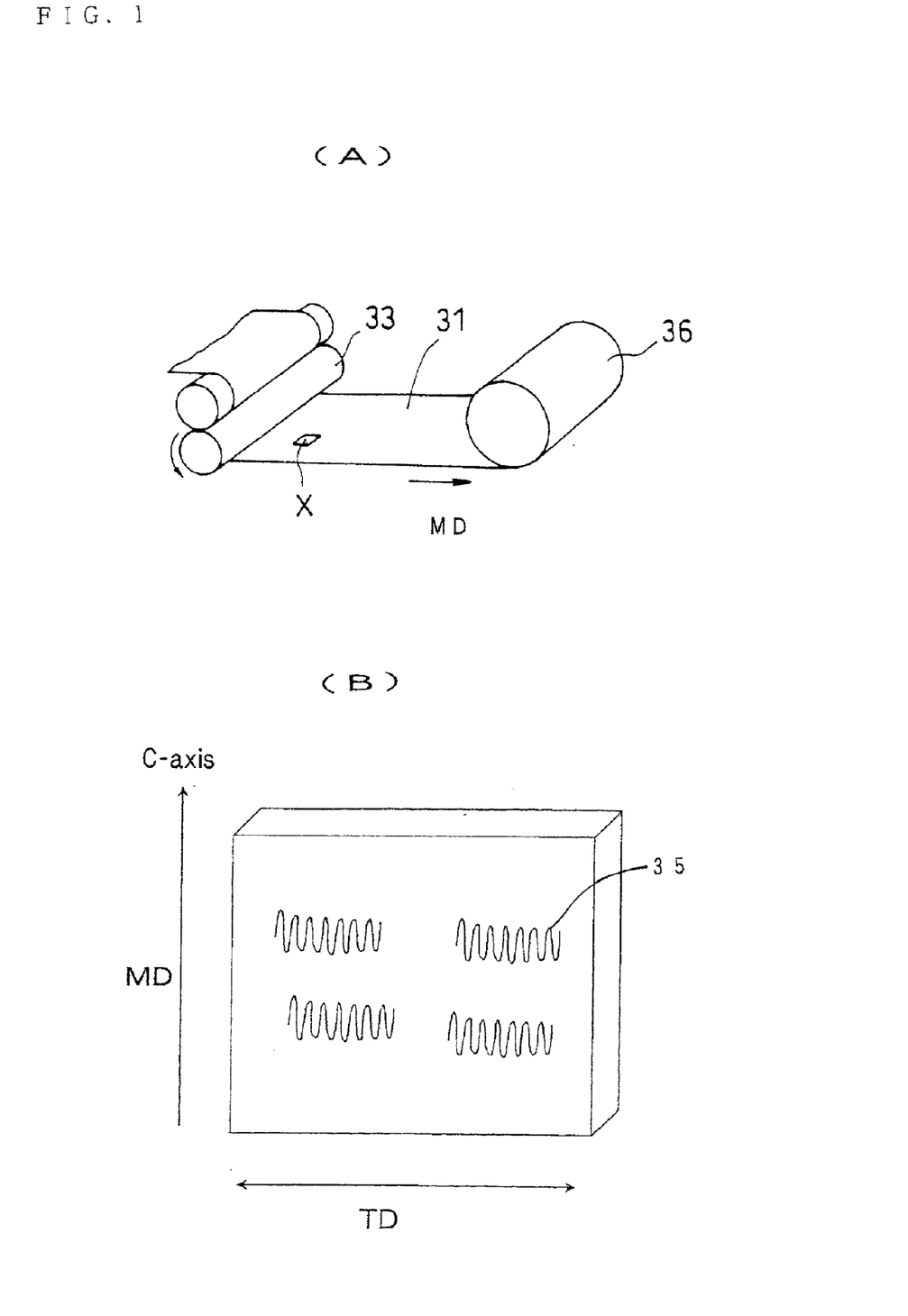

As shown in FIG. 1(A), a film 31 made of a crystalline thermoplastic resin and formed by rolling after drawing step using at least one pair of rolling rolls is fed out of a calendar roll 33 and rolled up on a roll 36. The magnified figure of a crystallized portion X of the film 31 produced in such a manner is schematically shown in FIG. 1(B). As shown in the figure, the state that 80% or more of c-axis (the axis in the thickness direction of the lamella) of the crystal of the polymer molecule 35 composing the crystalline thermoplastic resin of the film is oriented in the MD direction is one example of the state, "the orientation coefficient of the c-axis of the crystal in the film to the MD direction of said film is 0.8 or higher.".

According to the invention, a drawn film can be obtained by drawing a film made of the crystalline thermoplastic resin having 0.8 or higher orientation coefficient of the c-axis of the crystal of itself to the MD direction, which is measured by wide angle x-ray diffraction, in the TD direction using a stenter apparatus or the like. The draw ratio is not particularly restricted but preferably to be about 2 to 10 times.

As the method for obtaining the film of the crystalline thermoplastic resin, there are an inflation method, an extrusion method by a T-die and the like, yet the crystalline thermoplastic resin film having 0.8 or higher orientation coefficient of the c-axis of the crystal of the thermoplastic resin to the MD direction can reliably be obtained by producing by forming the crystalline thermoplastic resin by rolling.

In the invention, the term, "crystalline thermoplastic resin", means a thermoplastic resin having clear crystallinity in x-ray analysis and more particularly, it means a thermoplastic resin having 10% or higher crystalline degree calculated by wide angle x-ray diffraction. Incidentally, "crystalline thermoplastic resin" defined as above-described definition includes not only a single type thermoplastic resin but also a mixture of two or more types of thermoplastic resins.

That is, a mixture of two or more types of thermoplastic resins, which has 10% or higher crystalline degree calculated by wide angle x-ray diffraction, can be used as "crystalline thermoplastic resin" in the invention. In the case of a mixture of two or more types of thermoplastic resins, it is not required that all of the thermoplastic resins to be mixed respectively have crystallinity. Even a mixture of a crystalline thermoplastic resin and a non-crystalline thermoplastic resin maybe used as "crystalline thermoplastic resin" in the invention if the crystalline degree of the mixture as a whole is 10% or higher.

The thermoplastic resin includes polyolefin resins of olefin homopolymers of such as ethylene, propylene, butene, hexene, and the like, copolymers of two or more of such olefins, and copolymers of one or more olefins and one or more types of polymerizable monomers possible to be polymerized; acrylic resins such as poly (methyl acrylate), poly (methyl methacrylate), ethylene-ethyl acrylate copolymer and the like; styrene type resins such as butadiene-styrene copolymer, acrylonitrile-styrene copolymer, polystyrene, styrene-butadiene-styrene copolymer, styrene-isoprene-styrene copolymer, styrene-acrylic acid copolymer and the like; vinyl chloride type resins; vinyl fluoride type resins such as poly(vinyl fluoride), poly(vinylidene fluoride) and the like; amide type resins such as 6-nylon, 6,6-nylon, 12-nylon and the like; saturated ester type resins such as poly (ethylene terephthalate), poly (butylene terephthalate) and the like; polycarbonates; poly(phenylene oxide); polyacetals; poly (phenylene sulfide); silicone resins; thermoplastic urethane resins; polyether ether ketones; polyether imides; various thermoplastic elastomers; and their cross-linked materials.

The crystalline thermoplastic resin having 10% or higher crystalline degree by itself includes polyolefin resins of olefin homopolymers of such as ethylene, propylene, butene, hexene, and the like, copolymers of two or more of such olefins, and copolymers of one or more olefins and one or more types of polymerizable monomers possible to be polymerized with the olefins; vinyl chloride type resins; vinyl fluoride type resins such as poly (vinyl fluoride), poly (vinylidene fluoride) and the like; saturated ester type resins such as poly(ethylene terephthalate), poly(butylene terephthalate) and the like; poly(phenylene sulfide); poly (phenylene oxide); polyether ether ketones; and the like. Even a thermoplastic resin which does not have 10% or higher crystalline degree by itself can be used for the invention by being blended with any one of the foregoing crystalline thermoplastic resins having 10% or higher crystalline degree by themselves at a proper mixing ratio.

In the case of using a polyolefin resin as the thermoplastic resin, the formed film is excellent in recycling property and solvent resistance and does not emit dioxins or the like even if being incinerated and therefore does not deteriorate the environments and for such reasons, polyolefin resins are especially preferable to be used.

Olefins composing the olefin resins include ethylene, propylene, butene, hexene and the like. Practical examples of the polyolefin resins are polyethylene resins such as low density polyethylene, linear polyethylene (ethylene-a-olefin copolymer), high density polyethylene and the like; polypropylene resins such as polypropylene, ethylene-propylene copolymer and the like; poly(4-methylpent-1-ene); poly (but-1-ene); and ethylene-vinyl acetate copolymer.

Incidentally, the term, film, in the invention is used as a concept including not only those originally named as a film but also those like more or less thick sheets.

The foregoing film may contain 10 to 300 parts by weight of a filler to 100 parts by weight of the crystalline thermoplastic resin.

With such a constitution, a porous film with a high elastic modulus can be obtained by drawing and is usable for various uses such as a filter, a separator for a battery or an electrolytic capacitor, a filtration membrane, a humidity-permeable water-proofing clothes.

If the filler is less than 10 parts by weight, no porous film having a gas permeability is obtained and if more than 300 parts by weight, drawing cracks are possible to be caused at the time of drawing. The amount of the filler is more preferably 50 to 200 parts by weight to 100 parts by weight of the crystalline thermoplastic resin. Because an even and porous film can be obtained.

As the filler, an inorganic and an organic fillers may be used and for example, those usable as the inorganic filler are calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolites, glass powder, zinc oxide and the like.

As the organic filler, a variety of resin particles can be used and those preferable to be used are particles of homopolymers or polymers of two or more of styrene, vinyl ketone, acrylonitrile, methyl methacrylate, ethyl methacrylate, glycidyl methacrylate, glycidyl acrylate, methyl acrylate, and the like; and condensed polymer resins of such as melamine, urea and the like.

The crystalline thermoplastic resin forming the foregoing film is preferable to contain 10% by weight of a polyolefin with a molecular chain length of 2,850 nm or longer (in the invention, referred as to a long molecular chain polyolefin).

A film containing the long molecular chain polyolefin with a molecular chain length of 2,850 nm or longer in the crystalline thermoplastic resin is especially excellent in the strength and since the strength is remarkably improved if the film contains such a long molecular chain polyolefin in not less than 10% by weight, more preferably not less than 20% by weight, the film is usable for various purposes and if the film contains it in not less than 30% by weight, the strength is furthermore improved.

The long molecular chain polyolefin is preferable to be used in combination with a polyolefin wax in terms of processibility. The use in combination with such a wax leads to advantages that the touch of the resulting film is improved and that the film is easy to become free of pores at the time of processing (the durability is improved if it is used, for example, for separators or the like of batteries.).

Practical examples of such a polyolefin wax are waxes of polyethylene type resins such as a low density polyethylene, a linear polyethylene, (ethylene-α-olefin copolymers), a high density polyethylene and the like; polypropylene type resins such as polypropylene, ethylene-propylene copolymers and the like; poly(4-methylpent-1-ene), poly(but-1-ene), and ethylene-vinyl acetate copolymer.

For example, a polyolefin type resin containing 10% by weight or more of a polyolefin with a molecular chain length of 2,850 nm or longer can be obtained by mixing a polyolefin [A] with a weight average molecular chain length of 2,850 nm or longer and polyolefin was [B] with a weight average molecular weight of 700 to 6,000 in a weight ratio [A]/[B]=(90/10) to (50/50) and melting and kneading the mixture.

The molecular chain length, the weight average molecular chain length, the molecular weight, and the weight average molecular weight of a polyolefin can be measured by GPC (gel permeation chromatography) and the mixing ratio (% by weight) of a polyolefin with a molecular chain length in a specified range or a molecular weight in a specified range can be calculated by integration of molecular weight distribution curves obtained by the GPC measurement.

That is, as a mobile phase of the GPC measurement, a solvent which can dissolve an unknown sample to be measured and a standardized polystyrene with a known molecular weight is used. At first, a plurality of types of standardized polystyrenes with different molecular weights are subjected to the GPC measurement to obtain the retention time for each standardized polystyrene. Using Q factor of polystyrene, the molecular chain length of each standardized polystyrene is calculated and accordingly, the molecular chain length of each standardized polystyrene and the retention time corresponding to it are made known. Incidentally, the molecular weight, the molecular chain length, and the Q factor of each standardized polystyrene have the following relation.

$$\text{Molecular weight} = \text{Molecular chain length} \times Q \text{ factor}$$

Next, the GPC measurement is carried out for an unknown sample to obtain a retention time-eluted component amount curve. In the GPC measurement of the standardized polystyrene, if the molecular chain length of the standardized polystyrene whose retention time is T is defined as L, the molecular chain length L of the component whose retention time is T in the GPC measurement of an unknown sample is defined as "the molecular chain length on the basis of the polystyrene". Using such a relation, from the foregoing retention time-eluted component amount curve of the object unknown sample, the molecular chain length distribution on the basis of polystyrene (the relation between the molecular chain length on the basis of polystyrene and the eluted component amount) can be obtained.

The foregoing film is preferable to be drawn in the TD direction at a temperature T satisfying the following (Condition 1).

$$Tm > T > Tm - 50 \quad \text{(Condition 1)}$$

wherein Tm is a melting point of the crystalline thermoplastic resin.

With such a constitution, a porous drawn film with the good mechanical balance and excellent uniformity can be produced without causing drawing unevenness at the time of drawing. If the temperature T of the film at the time of drawing is Tm or higher, the film becomes free of pores and no porous film can be obtained and on the other hand, if it is (Tm−50) or lower, drawing cracks are easy to be formed at the time of drawing.

Incidentally, the melting point is a peak temperature in DSC (differential scanning calorimetry) and in the case there are a plurality of peaks, the peak temperature with the highest heat quantity of melting ΔH (J/g) is defined as the melting point. Also, the temperature increase speed at the time of measuring the melting point is adjusted to be 5° C./min.

Further, the production method of the porous film according to the invention is characterized in that a resin film made of a thermoplastic resin composition containing 10 to 300 parts by weight of a filler to 100 parts by weight of a thermoplastic resin is drawn in the TD direction in 2 to 10 times under the following conditions using a drawing apparatus comprising a preheating section, a drawing section, and a thermal treatment section.

$$T1/T2 > 1.05 \quad \text{(Condition 2)}$$

$$1.5 > T3/T2 > 1.2 \quad \text{(Condition 3)}$$

and $$Tm > T3 > (Tm - 5), \quad \text{(Condition 4)}$$

wherein T1 is a preheating temperature in the preheating section at the time of drawing; T2 is a drawing temperature in the drawing section; T3 is a thermally fixing temperature in the thermal treatment section; and Tm is the melting point of the thermoplastic resin.

With such a constitution, it is made possible to provide a production method capable of producing a porous film with little drawing unevenness and high uniformity even in the case of a film to be produced from a thermoplastic resin just like an olefin resin material, which is a resin composition with a high melt viscosity and low melt drawing, If the filler is less than 10 parts by weight, no porous film having a gas permeability is obtained and if more than 300 parts by weight, drawing cracks are possible to be caused at the time of drawing. The amount of the filler is more preferably 50 to 200 parts by weight to 100 parts by weight of the crystalline thermoplastic resin. Because an even and porous film can more surely be obtained.

Further, if the foregoing (Condition 2) and (Condition 3) are not satisfied, it is probable that drawing cannot evenly be carried out and drawing unevenness is caused and if the foregoing (Condition 4) is not satisfied, it is probable that the thermal stability of the obtained porous film is insufficient.

According to the above described results, it is made possible to produce a method capable of producing a resin film with a high film thickness precision even from a hardly formable thermoplastic resin containing a resin material with a high melt viscosity and low melt drawing, for example, a long molecular chain polyolefin resin.

The foregoing resin film is preferable to be produced by rolling and forming the foregoing thermoplastic resin composition using at least a pair of forming tools while the surface temperature To of the foregoing forming tools being set as to satisfy the following Conditions 5, 6 at the time of rolling and forming.

(Condition 5) To is a temperature at which the melt tensile force MT of the thermoplastic resin composition and the drawing degree L are within the following ranges $$MT > 10 \text{ g and } L > 100\%$$

$$To > Tm, \quad \text{(Condition 6)}$$

wherein Tm denotes the melting point of the thermoplastic resin.

With such a constitution, since a resin film with a high film thickness precision can be obtained, in the case such a film is drawn, a porous film with high film thickness can be obtained in addition to that as described above a film with little drawing unevenness and high uniformity can be obtained.

It is preferable to keep the peripheral speeds of the foregoing pair of rotary forming tools approximately equal to carry out rolling and forming.

With such a constitution, it is made possible to produce a resin film with further higher film thickness precision and to provide the excellently smooth and beautiful surface of the obtained film, so that a porous film further excellent in the thickness precision can be obtained in the case of further drawing the obtained film. In this case, that the peripheral speeds of a pair of rotary forming tools are approximately equal does not necessarily mean a strictly equal and same peripheral speed but it is acceptable if the difference is within ±5% in the case the peripheral speeds of both rotary forming tools differ.

BRIEF DESCRIPTION OF THE DRAWINGS

FIG. 1(A), (B) are schematic figures illustrating the crystal orientation of a film.

DETAILED DESCRIPTION OF THE PREFERRED EMBODIMENTS

A production method of a drawn film according to the present invention will be described in details below. A film is produced from a thermoplastic resin composition containing a crystalline thermoplastic resin and a filler (in the case of producing a porous film) and after being slit to a prescribed width, the film is drawn 2 to 10 times in the TD direction by a drawing apparatus, which will be described later, to obtain a drawn film. In the case of producing a porous film, the drawing is carried out at a temperature lower than the melting point Tm of the crystalline thermoplastic resin and based on the necessity, the filler is removed using an acid or the like. A practical example of the process will be described in accordance with figures below.

<Film Production Process>

Figure 2:
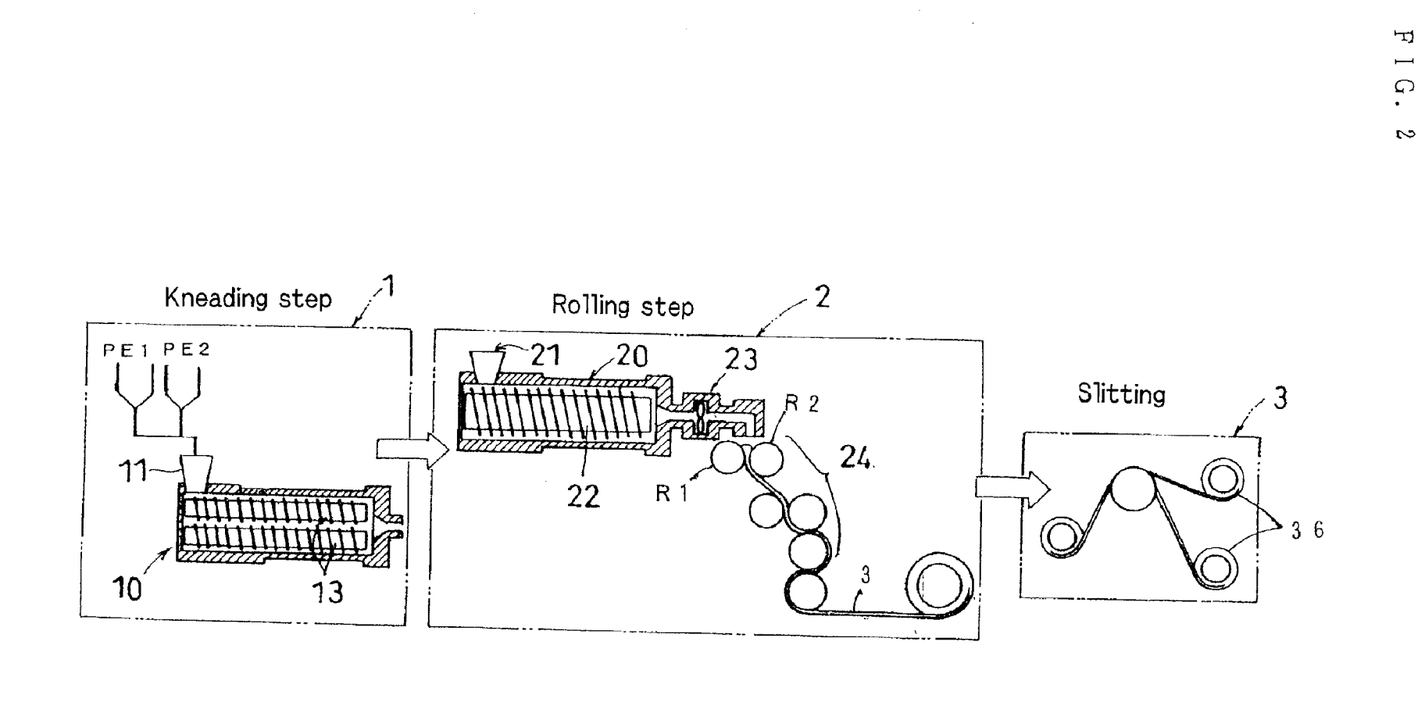
FIG. 2 is a diagrammatic figure of outline steps illustrating one embodiment of a production method of a drawn film according to the invention.

FIG. 2 is a schematic view illustrating the production line for producing a crystalline thermoplastic resin film. This production line comprises respective steps; a kneading step 1, a rolling step 2, and a slitting step 3; in this order. In the following example, a polyolefin resin is used.

In the kneading step 1, a screw kneading apparatus 10 is used and the kneading apparatus 10 is provided with a first hopper 11 for supplying a long molecular chain polyolefin PE1 and a polyolefin wax PE2. A filler such as an inorganic filler or the like is supplied from a separately installed second holler (not shown in figures). Through the kneading step 1, for example, 100 parts by weight of polyethylene resin with a molecular chain length of 2,850 nm or longer and 10 to 300 parts by weight of a filler and if necessary, a nonionic surfactant are kneaded to obtain a resin composition. Incidentally, the resin composition may additionally contain a fatty acid ester, a stabilizer, an antioxidant, an ultraviolet absorbent, a flame retardant unless they interfere the purpose of the invention.

The screw kneading apparatus 10 is provided with a biaxial screw 13 and forcibly kneads and extrude the mixed resin supplied from the first hopper 11. The resin composition obtained by the kneading is pelletized.

In the rolling step 2, a screw extruding apparatus 20 is employed. The apparatus 20 is provided with a hopper 21 to charge the pellet of the resin composition obtained in the kneading step 1 through and a screw 22. By the apparatus 20, the resin composition is extruded forward while being plasticized and kneaded and then discharged a rod-like or a sheet-like melted resin by dies 23 and rolled by a rolling roll mechanism 24 to obtain a film.

In this case, the surface temperature To of a pair of the rolling rolls R1, R2 positioned in the upstream side in the rolling roll mechanism 24 is preferable to satisfy the following (Condition 5) and (Condition 6).

(Condition 5) To is a temperature at which the melt tensile force MT of the thermoplastic resin composition and the drawing degree L are within the following ranges MT>10 g and L>100%

To>Tm, (Condition 6)

wherein Tm denotes the melting point of the thermoplastic resin.

By doing so, since a resin film with a high thickness precision can be obtained, an evenly drawn film with little drawing unevenness is obtained and also a drawn film with a high thickness precision can be obtain by drawing such a film.

Further, the peripheral speeds of the foregoing pair of rolling rolls R1, R2 are preferable to be kept approximately same as each other to carry out the rolling and forming. By doing so, it is made possible to produce a resin film with further higher film thickness precision and to provide the excellently smooth and beautiful surface of the obtained film, so that a drawn film further excellent in the thickness precision can be obtained in the case of further drawing the obtained film in the following steps. In this case, that the peripheral speeds of the foregoing pair of rolling rolls R1, R2 are approximately equal means they are strictly same peripheral speeds and also the difference is within ±5% even if the peripheral speeds of both rolling rolls differ.

By carrying out a drawing method, which will be described later, following the above-described rolling method, it is made possible to produce a porous film with the good mechanical balance, little drawing unevenness, and excellent uniformity even from a hardly formable resin material such as a thermoplastic resin composition having a high crystalline degree and containing a large quantity of a resin with a high melt viscosity and low melt drawing. Moreover, in this case, even if drawing is carried out to the far extent to the thickness of 200 μm or thinner, a porous film with a high thickness precision as precise as ±2% can be obtained.

A method for supplying the resin composition to the rolling apparatus is not particularly restricted and for example, a rod-like melted resin extruded from the extrusion apparatus can be supplied. Further, if possible, preliminary forming to a thickness of several mm to several cm may be carried out by a T-die forming method and the resulting resin may be supplied. Also, as the rolling apparatus, for example, apparatuses comprising rolling rolls, a continuos press, or calendar rolls can be employed.

In the slitting step 3, the film obtained in the rolling step 2 is cut into two in the width direction. For example, two film rolls 36 with a width of 300 mm each are obtained from a rolled film with a width of 600 mm.

Incidentally, the slitting step 3 is a step to be carried out based on necessity, for example, for the purpose to remove unnecessary part from the resin film obtained by rolling or for the purpose to cut the rolled film in a prescribed width and can be omitted.

<Drawing Film Production Step>

Figure 3:
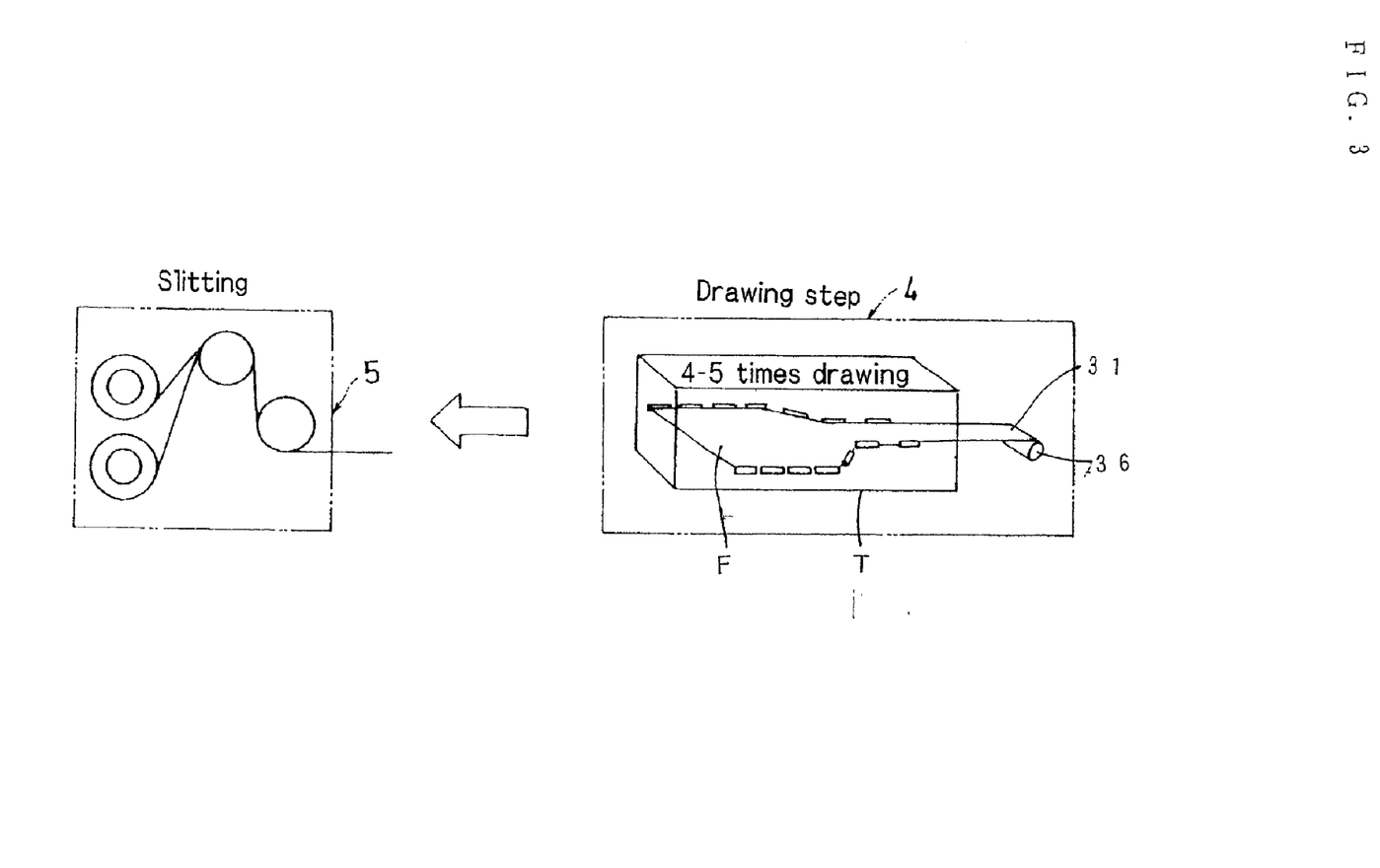
FIG. 3 is a diagrammatic figure illustrating the steps in the downstream side of FIG. 2.

After a resin film 31 is obtain by the above-described steps, the obtained film 31 is successively subjected to the drawing step 4 and further a slitting step 5 for slitting the drawn film as shown in FIG. 3 to obtain a drawn film. The slitting step 5 is a step to be carried out based on necessity, for example, for the purpose to remove unnecessary part from the drawn film or for the purpose to cut the drawn film in a prescribed width and can be omitted.

In the drawing step 4, the foregoing rolled film with a width of 300 mm is drawn 2 to 10 times, preferably 4 to 5 times, in the TD direction (the film width direction) using a stenter apparatus under the above-described (Condition 1). Consequently, a thermoplastic resin film drawn in the width direction can be obtained. Such a drawn film F is provided with both high elastic modulus and strength in the width direction.

Figure 4:
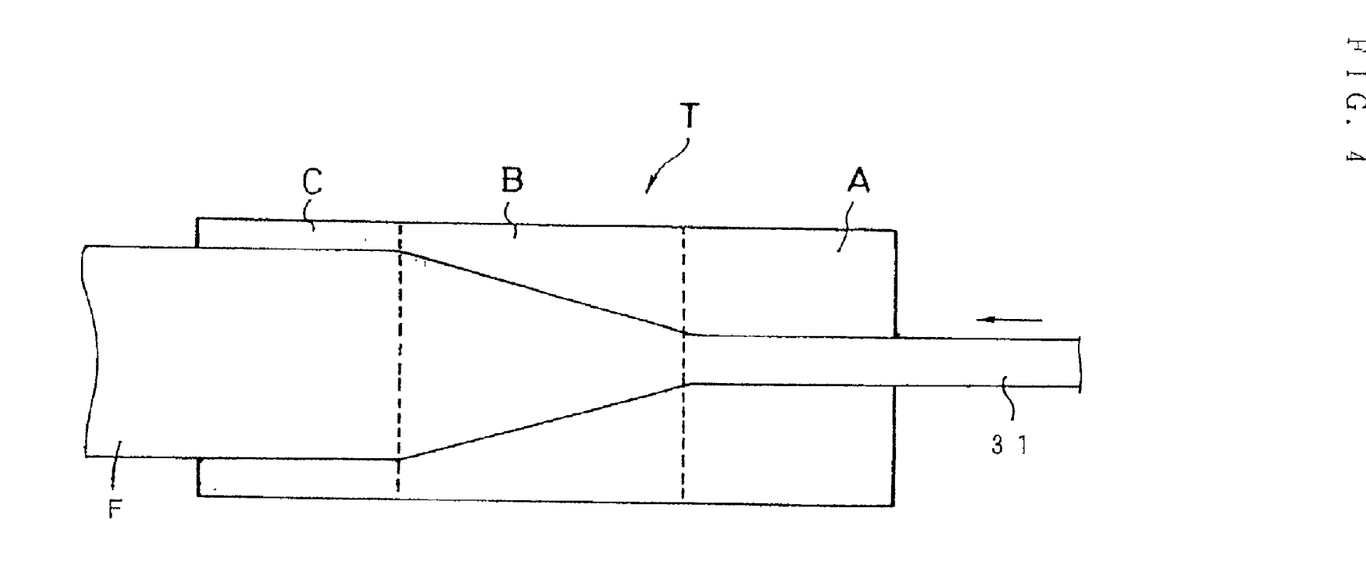
FIG. 4 is a diagrammatic plane view of a stenter apparatus in FIG. 3.

In the case of producing a porous film from a film containing a filler, it is further preferable that the drawing step 4 is carried out by using a stenter apparatus divided into three heating zones, as shown in FIG. 4, respectively controlled under the following (conditions). That is, the stenter apparatus T is divided into three zones; a preheating zone A to take the film 31 fed from the upstream side in through the inlet and to draw the film 31 while heating it, a drawing zone B to draw the film in the TD direction; and a thermal treatment zone C to remove the inner stress attributed to the drawing and carry out thermal fixation and so composed as to produce a drawn film with a prescribed thickness. By setting the temperature conditions in the respective zones according to the following (Condition 2) to (Condition 4), drawing can evenly be carried out and a drawn film free of drawing unevenness can be obtained.

$$T1/T2 > 1.05, \quad \text{(Condition 2)}$$

$$1.5 > T3/T2 > 1.2, \quad \text{(Condition 3)}$$

and $$Tm > T3 > (Tm-5), \quad \text{(Condition 4)}$$

wherein T1 is a preheating temperature in the preheating zone at the time of drawing; T2 is a drawing temperature in the drawing zone; T3 is a thermally fixing temperature in the thermal treatment zone; and Tm is the melting point of the thermoplastic resin.

Doing so, a porous film with further less drawing evenness and high uniformity can be produced from a film produced from a crystalline thermoplastic resin composition, which is a resin composition having an especially high melt viscosity and low drawing and containing a large quantity of a long molecular chain polyolefin resin.

In the final slitting step 5, the obtained film made of the crystalline thermoplastic resin is cut into a desired width size.

The drawn film produced in such a manner has scarce drawing unevenness, good mechanical balance, and excellent uniformity even if the material has a high crystallinity and is a film having a high elastic modulus and high strength. Further, the film to which no filler is added is excellent in transparency.

EXAMPLES

The embodiments of the invention will be described further along examples, however the invention will not at all restricted to these examples.

Hereinafter, the results of practical measurement tests will be described. The evaluation of the measurement results was carried out base on appearance observation and thrusting strength results.

[Measurement of Thrusting Strength]

A needle with a curvature radius of 0.5 mm at the needle tip and a length of 1 mm was thrust at 200 mm/min at a fixed film and the maximum load (gf) at the time of opening a hole was measured.

Example 1

Seventy % by weight of a long molecular chain polyethylene powder (Hi-Zex Million 340 M produced by Mitsui Chemical Ind. Ltd., weight average molecular chain length 17,000 nm, weight average molecular weight 3,000,000) and 30% by weight of a low molecular weight polyethylene powder (weight average molecular weight 1,000) were kneaded by a biaxial reaction extruder and 120 parts by weight of calcium carbonate (Star vigot 15A produced by Shiraishi Calcium Kaisha, Ltd.) was added to 100 parts by weight of the resin mixture in a middle of the extruder and then being melted and kneaded at 230° C., the resulting mixture was rolled by a pair of rolls rotated at equal speed and at a roll surface temperature of 150° C. to produce a film with a film thickness of about 60 μm. The obtained film was subjected to the investigation of the orientation of the (110) plane by wide angle x-ray diffraction to find the orientation coefficient of the c-axis of the crystal of the resin in the MD direction was 0.90. The film was drawn 5 times in the TD direction by a stenter drawing apparatus at 110° C. (drawing temperature), 116° C. (preheating temperature), and 130° C. (thermally fixing temperature). Incidentally, the content of the polyethylene with a molecular chain length of 2,850 nm or higher in the resin mixture was 27% by weight.

Example 2

A hundred parts by weight of polypropylene (FS 2011 D produced by Sumitomo Chemical Co., Ltd.) was kneaded by a biaxial extruder and 120 parts by weight of calcium carbonate (Star vigot 15A produced by Shiraishi Calcium Kaisha, Ltd.) was added to 100 parts by weight of the resin in a middle of the extruder and then being melted and kneaded at 230° C., the resulting mixture was rolled by a pair of rolls rotated at equal speed and at a roll surface temperature of 175° C. to produce a film with a film thickness of about 60 μm. The obtained film was subjected to the investigation of the orientation of the (110) plane by wide angle x-ray diffraction to find the orientation coefficient of the c-axis of the crystal of the resin in the MD direction was 0.91. The film was drawn 5 times in the TD direction by a stenter drawing apparatus.

Comparative Example 1

The film produced in the example 1 and having 0.90 orientation coefficient of the c-axis of the crystal of the resin in the MD direction was pressed by a two-step press (220° C., 100 kgf/cm²) to obtain a film whose orientation coefficient of the c-axis of the crystal of the resin in the MD direction was 0 and orientation coefficient of the s-axis of the crystal of the resin in the MD direction was 0.44. The film was drawn 5 times in the TD direction by a stenter drawing apparatus at 110° C. (drawing temperature), 116° C. (preheating temperature), and 130° C. (thermally fixing temperature).

The measurement results of these examples and comparative example are shown in TABLE 1.

TABLE 1

| | drawing temperature (° C.) | appearance | thrusting strength (g/25 μm) | |
| --- | --- | --- | --- | --- |
| | | | center | ear part |
| Example 1 | 110 | good | 450 | 455 |
| Example 2 | 150 | good | 130 | 130 |
| Comparative Example 1 | 110 | drawing unevenness | 300 | 350 |

According to the results of TABLE 1, both examples 1, 2 were free of drawing unevenness and excellent in uniformity, whereas the film of the comparative example was found having drawing unevenness, the thrusting strength in a wide dispersion in the width direction, and therefore inferior in the uniformity.

Further, the uniformity was measured by variously changing the preheating temperature, the drawing temperature, and the thermally fixing temperature in the stenter apparatus. The measurement results will be described. The measurement method and measurement apparatus employed were as follows.

[Melt Tensile Force]

As a measurement apparatus, Capirograph 1B PC-9801VM manufactured by Toyo Seiki Manufacturing Co., Ltd. was employed and an orifice with a diameter D=2.095 mm and a length L=14.75 mm was use. At first, a resin was extruded at 5 mm/min speed and pulled while the pulling speed being changed and the pulling speed at the time the resin was cut was defined as the maximum pulling speed. The melt tensile force at the maximum pulling speed was define as the melt tensile force at the temperature.

[Percent Drawing]

As a measurement apparatus, Capirograph 1B PC-9801VM manufactured by Toyo Seiki Manufacturing Co., Ltd. was employed and an orifice with a diameter D=2.095 mm and a length L=14.75 mm was use. At first, a resin was extruded at 5 mm/min speed and the diameter $D_1$ (mm) of the resin was measured. Next, the resin was pulled while the pulling speed being changed and at the time the resin was cut, the diameter $D_2$ (mm) of the resin was measured and the Percent drawing was calculated from the following equality.

Percent drawing (%)=$[D_1^2-D_2^2)/D_1^2] \times 100$

[Measurement of Molecular Chain Length and Molecular Weight by GPC]

As a measurement apparatus, Gel Chromatograph Alliance GPC2000 model manufactured by Waters Co. was employed. Other conditions were as follows.

Column: TSK gel GMH$_{HR}$-H(S)HT 30 cm×2 and TSK gel GMH$_6$-HTL 30 cm×2 manufactured by Tosoh Corporation,
Mobile phase: o-dichlorobenzene,
Detector: differential refractometer,
Flow rate: 1.0 mL/minute,
Column temperature: 140° C., and
Injection amount: 500 µL.

After 30 mg of a sample was completely dissolved in 20 mL of o-dichlorobenzene at 145° C., the solution was filtered through a sintered filter with a pore diameter of 0.45 µm and the obtained filtrate was used as a supply solution.

Incidentally, the calibration curves were produced using 16 types of standardized polystyrene and as Q factor of polystyrene was set to be 41.3.

[Measurement of Film Thickness]

The thickness of the obtained film was measured at a plurality of points in the width direction and in the longitudinal direction using Off-line Sheet Thickness Meter (TOF 2 Var 3.22) manufactured by Yamabun Electric Co., Ltd. The average value of all of the measured values was calculated and further the ratio (positive sign) of the difference between the maximum value among the measured values and the average value to the average value was calculated. Furthermore, the ratio (negative sign) of the difference between the minimum value among the measured values and the average value to the average value was calculated. The precision of the thickness was expressed based on these ratios.

[Measurement of Gure value]

The Gure value $T_{GUR}$ (second/100 cc) of the porous film was measured by B-type Densometer (manufactured by Toyo Seiki Manufacturing Co., Ltd.) in accordance with JIS P8117.

Example 3

Seventy % by weight of a long molecular chain polyethylene powder (Hi-Zex Million 340 M produced by Mitsui Chemical Ind. Ltd., weight average molecular chain length 17,000 nm, weight average molecular weight 3,000,000) and 30% by weight of a low molecular weight polyethylene powder (Hi-wax produced by Mitsui Chemical Ind. Ltd., weight average molecular weight 1,000, melting point 110° C.) were kneaded by a biaxial kneader and 120 parts by weight of calcium carbonate (Star vigot 15A produced by Shiraishi Calcium Kaisha, Ltd.) was added to 100 parts by weight of the resin mixture in a middle of an extruder and melted and kneaded at 230° C. to obtain a resin composition. The content of the polyethylene with a molecular chain length of 2,850 nm or higher in the resin mixture was 27% by weight. The resulting resin composition was rolled by a pair of rolls rotated at equal speed and at a roll surface temperature of 149° C. to produce a film with a film thickness of about 58 µm. The thickness precision of the film was within ±2% and the melting point was 136° C. Incidentally, the melt tensile force could not be measured accurately, yet it was 140 g or higher and the percent drawing was about 300%. The film was then drawn 5 times by a stenter drawing apparatus under the conditions shown in TABLE 2.

Example 4

A film was produced in the same manner as the example 3 and then drawn 5 times by a stenter drawing apparatus under the conditions shown in TABLE 2.

Comparative Example 2

A film was produced in the same manner as the example 3 and then drawn 5 times by a stenter drawing apparatus under the conditions shown in TABLE 2.

Comparative Example 3

A film was produced in the same manner as the example 3 and then drawn 5 times by a stenter drawing apparatus under the conditions shown in TABLE 2. Incidentally, in this case, Gure value could not measured since drawing cracking took place.

TABLE 2

|  | preheating temperature (° C.) | drawing temperature (° C.) | thermal fixing temperature (° C.) | Appearance (eye observation) | Gure value (second) | |
|---|---|---|---|---|---|---|
|  |  |  |  |  | center part | ear part |
| Example 3 | 116 | 110 | 133 | good | 175 | 180 |
| Example 4 | 110 | 90 | 132 | good | 160 | 160 |

TABLE 2-continued

|  | preheating temperature (° C.) | drawing temperature (° C.) | thermal fixing temperature (° C.) | Appearance (eye observation) | Gure value (second) | |
|---|---|---|---|---|---|---|
|  |  |  |  |  | center part | ear part |
| Comparative Example 2 | 115 | 120 | 133 | drawing unevenness | 200 | 500 |
| Comparative Example 3 | 85 | 80 | 133 | drawing cracking | — | — |

As shown in TABLE 2, the film of the comparative example 2 showed high Gure permeability, uneven pore distribution, a wide dispersion in the width direction and moreover the appearance of the film was found having drawing unevenness, whereas in the examples, it was found uniform and porous films free from such defects were obtained.

Figure 5:
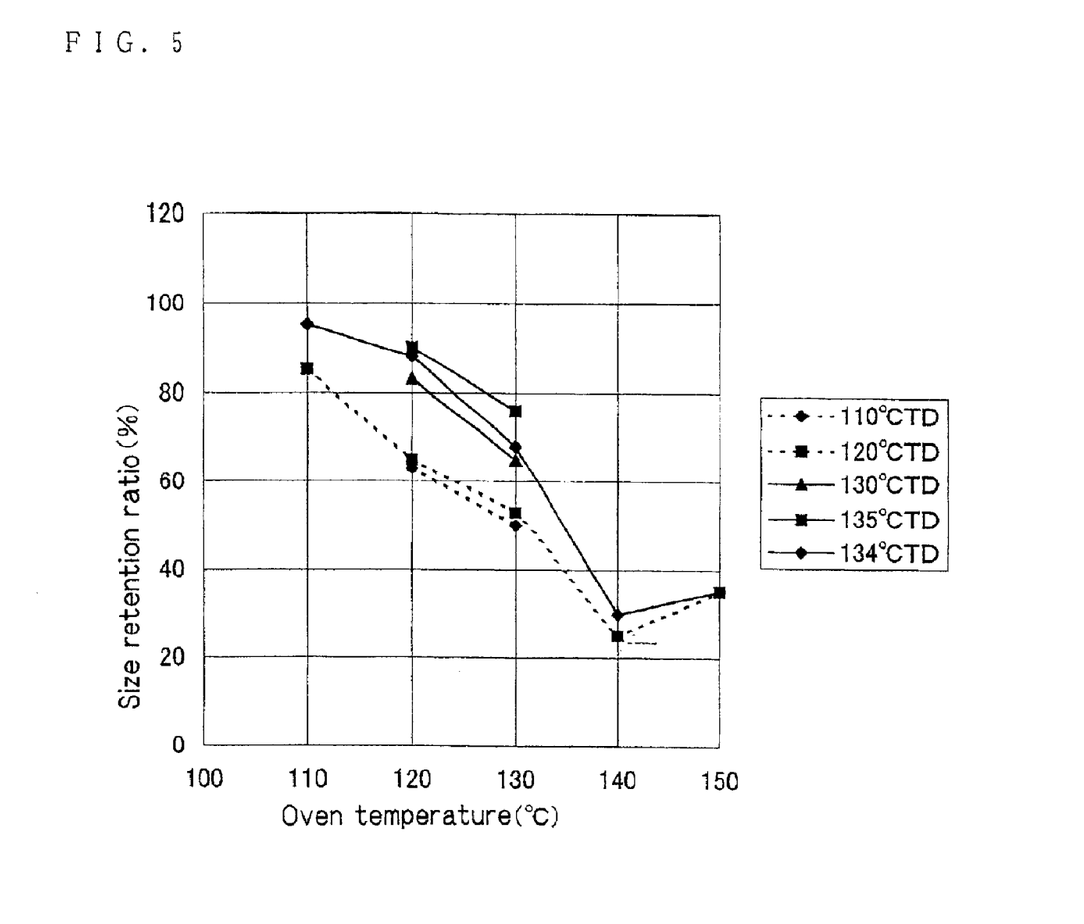
FIG. 5 is a graph showing the measurement results of thermal contraction retention ratio of a film obtained by the method of the invention.

Next, in order to investigate the effect of the thermally fixing temperature, the thermally fixing temperature was changed to be 110, 120, 130, 134, 135° C. while the preheating temperature and the drawing temperature being kept at 116° C. and 110° C., respectively, and the thermal stability at the time of heating was evaluated based on the size retention ratio and the results are shown in FIG. 5.

Being made clear from FIG. 5, the size retention ratios were high in the case of thermally fixing temperature 130, 134, and 135° C. which satisfy the above-described (Condition 4) to (Condition 6) and uniform films excellent in the thermal stability were obtained.

[Measurement of Size Retention Ratio]

A specimen with a size of 3 cm (in the MD direction)×4.8 cm (in the TD direction) was heated in an oven in the free state for 10 minutes. After that, the specimen was taken out of the oven and cooled at a room temperature (25° C.) for 20 minutes and then the length Y (mm) of the specimen in the TD direction was measured by slide calipers.

The size retention ratio was calculated according to the following equality.

Size retention ratio (%)=(Y/48)×100.

What is claimed is:

1. A drawn film production method consisting essentially of steps of drawing a crystalline thermoplastic resin film in the TD direction, wherein the orientation coefficient of the c-axis of the crystal of the thermoplastic resin in the film to the MD direction of the film is 0.8 or higher.

2. The drawn film production method according to claim 1, wherein the film contains 10 to 300 parts by weight of a filler to 100 parts by weight of the crystalline thermoplastic resin.

3. The drawn film production method according to claim 2, wherein an organic or an inorganic filler is used as the filler.

4. The drawn film production method according to claim 1, wherein the crystalline thermoplastic resin contains 10% by weight or more of a polyolefin with a molecular chain length of 2,850 nm or longer.

5. The drawn film production method according to claim 2, wherein the film is drawn in the TD direction at a temperature T satisfying the following condition:

$Tm>T>Tm-50$, (Condition 1)

wherein Tm is a melting point of the crystalline thermoplastic resin.

6. The drawn film production method according to claim 5, wherein the film is drawn 2 to 10 times in the TD direction.

7. The drawn film production method according to claim 1, wherein the crystalline thermoplastic resin film is produced from a crystalline thermoplastic resin by any one of methods selected from a rolling method, an inflation method, and an extrusion method using T dies.

8. The drawn film production method according to claim 7, wherein in the case the crystalline thermoplastic resin film is produced from the crystalline thermoplastic resin by the rolling method, the peripheral speeds of a pair of rolling rolls are kept approximately the same speeds as each other to roll the film.

9. A porous film production method comprising steps of producing a resin film made of a thermoplastic resin composition using a drawing apparatus, wherein the thermoplastic resin composition contains 10 to 300 parts by weight of a filler to 100 parts by weight of a thermoplastic resin and that the resin film is drawn 2 to 10 times in the TD direction under the following conditions for a preheating section, a drawing section, and a thermal treatment section of the drawing apparatus:

$T1/T2>1.05$, (Condition 2)

$1.5>T3/T2>1.2$, (Condition 3)

and $Tm>T3>(Tm-5)$, (Condition 4)

wherein T1 is a preheating temperature in the preheating section at the time of drawing; T2 is a drawing temperature in the drawing section; T3 is a thermally fixing temperature in the thermal treatment section; and Tm is the melting point of the thermoplastic resin, an organic or an inorganic filler is used as the filler.

10. The porous film production method according to claim 9, wherein the thermoplastic resin contains 10% by weight or more of a polyolefin with a molecular chain length of 2,850 nm or longer.

11. The porous film production method according to claim 9, wherein the resin film is produced from the thermoplastic resin composition using at least a pair of forming tools by rolling while the surface temperature of To of the forming tools being set as to satisfy the following conditions 5, 6:

(Condition 5) To is a temperature at which the melt tensile force MT of the thermoplastic resin composition and the drawing degree L are within the following ranges $MT>10$ g and $L>100\%$ and $To>Tm$, (Condition 6)

wherein Tm denotes the melting point of the thermoplastic resin.

12. The porous film production method according to claim 11, wherein rolling is carried while the peripheral speeds of the pair of rotary forming tools being kept approximately the same speeds as each other.

13. The porous film production method according to claim 9, wherein the film made of the crystalline thermoplastic resin has 0.8 or higher orientation coefficient of the c-axis of the crystal of the thermoplastic resin in the film to the MD direction of the film and obtained by drawing in the TD direction.

14. The porous film production method according to claim 9, wherein the organic filler is one or more of compounds selected from homopolymers or polymers of two or more of styrene, vinyl ketone, acrylonitrile, methyl methacrylate, ethyl methacrylate, glycidyl methacrylate, glycidyl acrylate, and methyl acrylate; and condensed polymer resins of melamine and urea.

15. The porous film production method according to claim 9, wherein the organic filler is one or more of compounds selected from calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolites, glass powder, and zinc oxide.

* * * * *